United States Patent Office 3,772,352
Patented Nov. 13, 1973

3,772,352
ALUMINUM ALCOHOLATES OF N-ACETYL-p-AMINOPHENOL
Martin M. Rieger, Morris Plains, N.J., assignor to Warner-Lambert Company, Morris Plains, N.J.
No Drawing. Filed Nov. 22, 1971, Ser. No. 201,177
Int. Cl. C07f 5/06
U.S. Cl. 260—448 AD                     1 Claim

ABSTRACT OF THE DISCLOSURE

The present invention relates to aluminum alcoholates of N-acetyl-p-aminophenol. N-acetyl-p-aminophenol itself is a well-known analgesic which, when changed to these compounds, is considerably improved in taste.

---

N-acetyl-p-aminophenol, also called APAP, is an effective analgesic compound which is particularly useful because, in addition to its effectiveness as an analgesic, it is relatively free from side effects.

It is recognized that it is desirable to produce analgesics in convenient-to-use forms such as chewable tablets or gums. Prior to the present invention, APAP has been considered to be unsuitable for inclusion in such a chewable form because of its generally unacceptable bitter taste. This bitter taste is especially strong when the compound remains in the mouth for a period of time.

The chewable forms which would be most appropriate for use as carriers in the present invention would be chewing gum or a pressed mint tablet. The great advantage of such a form is the convenience of being able to carry it on one's person and the avoidance of the need to have water available at the time of taking it.

It is an object of the present invention to provide a derivative of APAP which will diminish its unacceptable bitter taste substantially or eliminate it entirely.

It is a further object of the present invention to provide an easy-to-use dosage form containing a derivative of APAP which upon ingestion reacts with the stomach contents to give the original APAP compound and in addition produces aluminum hydroxide which acts as an antacid.

It has been found that reacting APAP with aluminum isopropoxide in a slurry of isopropyl alcohol produces an alcoholate of limited solubility in water and with greatly reduced or completely eliminated bitter taste. A specific example of a method of preparing such a compound is given as follows: APAP 0.1 M (15.1 g.) is dissolved in 200 ml. of isopropanol. The isopropanol-APAP solution is dried over anhydrous sodium sulphate overnight in a refrigerator at 4° C. The resort to a reduced temperature is based on the common knowledge that anhydrous sodium sulphate is a more effective drying agent at such temperatures. Water is avoided as much as possible because it reacts with the aluminum isopropoxide to break it down to isopropanol and aluminum hydroxide which is an impurity in the final product. The sodium sulphate is removed from the isopropanol-APAP solution by filtration. The temperature of the effluent solution is allowed to rise to ambient temperature. It is then added to a filtered solution of 0.1 M of aluminum isopropoxide in 200 ml. of isopropanol. This latter solution is prepared by heating an isopropanol slurry of aluminum isopropoxide containing 9% aluminum by weight based on the combined weight of isopropanol and aluminum isopropoxide. The mixture is allowed to blend completely, after which 200 ml. of hexane is added. The addition of hexane causes a copious precipitate to form. The precipitate is removed by filtration. The filter cake is dried in a vacuum dessicator. Approximately 10 g. of solid are obtained (yield—30% of theory).

Another method of obtaining the compounds of the present invention is to increase the mol ratio of APAP to aluminum isopropoxide to a level of 3 or more to 1. After the reagents have reacted, a precipitate is formed spontaneously. This precipitation may be aided by reducing the temperature of the solution. The product upon analysis is almost identical to that produced by the precipitation induced by the addition of hexane. The materials produced in accordance with the present invention assayed as follows: APAP—56 to 60%, aluminum—13.1 to 13.2%, isopropyl alcohol—20 to 21%. The result of the reaction itself is an aluminum alkoxide or alcoholate which has bound to it one or more phenol groups replacing one or more isopropyl groups.

The reaction which takes place may be represented by the following formula:

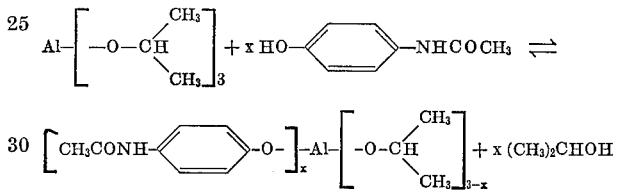

wherein $x$ is an integer from 1 to 3.

In the cases of Examples 4 and 5, where the mole ratio of APAP to aluminum isopropoxide, is 3 or more, the precipitate of the product form will either form spontaneously or after the cooling of the solution below room temperature.

The products of each of the examples have approximately the same content of aluminum, APAP and isopropyl moieties. The precipitate may be removed by filtration and washed with isopropanol, and dried in a vacuum dessicator.

The dried material may contain trace amounts of impurities, such as aluminum hydroxide, unreacted APAP, and aluminum isopropoxide. It has no distinct taste other than that of bland salt. It may be mixed with the ingredients which are suitable for formulation of a pressed tablet combined with a gum base in the conventional manner. The following formulations are given by way of exemplification and not by way of limitation.

| | Mg. |
|---|---|
| Pressed mint: | |
| Al/APAP derivative (60% APAP) | 540 |
| Mannitol, granular | 675 |
| Sodium saccharine, M.F. | 10 |
| Orange flavor oil (Sterotox ®) | 50 |
| Stearic acid, triple processed | 50 |
| Gum: | |
| Gum base | 600 |
| Glucose 44° | 504 |
| Al/APAP derivative (60% APAP) | 540 |
| Sugar | 1334 |
| Sodium saccharine | 2 |
| Flavor | 20 |

The ingredients for both the pressed mint and gum formulations are blended and processed in the usual manner. The products may be permitted to dissolve in the mouth in the case of the pressed mint or chewed in the usual fashion with respect to the gum. No distinctive bitter taste of the APAP is detectable.

As the number of APAP groups increase, the solubility in water of the aluminum alcoholates of the present invention decreases. It has been determined for the purposes of the present invention that once the N-acetyl-p-aminophenol moiety attaches to the aluminum atom there is no longer the unacceptable bitter taste which hitherto had been the reason these analgesics have not been prepared in chewable form.

Other examples of the APAP aluminum isoproxide combinations can be given as follows:

| Ex. | APAP (M) | Al(i-P)$_3$ (M) | Method of precipitation | Yield |
|---|---|---|---|---|
| 2 | 0.1 | 0.1 | Hexane addition | About 30%. |
| 3 | 0.2 | 0.1 | do | Do. |
| 4 | 0.3 | 0.1 | Direct precipitation | Do. |
| 5 | 0.5 | 0.1 | do | Do. |
| 6 | 0.1 | 0.2 | Hexane addition | Less than 30%. |

It can be seen that there is no advantage in increasing the mole ratio of aluminum isoproxide to APAP. The product formed when the mole ratio of the aluminum compound is twice that of the APAP is essentially the same as that obtained in the other reactions though in a yield somewhat less than that obtained in those other reactions but which nonetheless requires the addition of hexane or some other inert non-polar solvent to cause the precipitation of the desired material.

What is claimed is:
1. Compounds of the following formula:

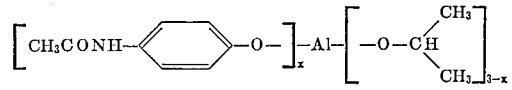

wherein $x$ is an integer from 1 to 3.

References Cited

UNITED STATES PATENTS 2,292,205  8/1942  Denison et al. ___ 260—448 AD

FOREIGN PATENTS 932,251  7/1963  Great Britain ___ 260—448 AD
911,632  11/1962  Great Britain ___ 260—448 AD

OTHER REFERENCES

Chemical Abstracts, vol. 55, 13357h (1961).

DANIEL E. WYMAN, Primary Examiner

H. M. S. SNEED, Assistant Examiner

U.S. Cl. X.R.

424—324